(12) United States Patent
Cummins et al.

(10) Patent No.: US 6,990,674 B1
(45) Date of Patent: Jan. 24, 2006

(54) PICKER SUPPORT FOR DISC DUPLICATOR

(75) Inventors: Robert P. Cummins, Deephaven, MN (US); Erick Hagstrom, Medina, MN (US)

(73) Assignee: Primera Technology, Inc., Plymouth, MN (US)

(*) Notice: Subject to any disclaimer, the term of this patent is extended or adjusted under 35 U.S.C. 154(b) by 419 days.

(21) Appl. No.: 10/214,651

(22) Filed: Aug. 8, 2002

Related U.S. Application Data
(60) Provisional application No. 60/310,924, filed on Aug. 8, 2001.

(51) Int. Cl.
*G11B 17/04* (2006.01)

(52) U.S. Cl. .................... 720/623; 369/30.85
(58) Field of Classification Search ........... 720/623, 720/619, 622, 632, 604; 369/30.85, 30.31–30.39, 369/30.45, 30.51, 30.57, 30.61, 191, 194
See application file for complete search history.

(56) References Cited

U.S. PATENT DOCUMENTS

| | | | |
|---|---|---|---|
| 5,873,692 A | 2/1999 | Costas | 414/796.9 |
| 5,914,918 A * | 6/1999 | Lee et al. | 369/30.32 |
| 6,141,298 A | 10/2000 | Miller | 369/30 |
| 6,321,649 B1 * | 11/2001 | Vangen et al. | 101/35 |
| 6,327,230 B1 | 12/2001 | Miller et al. | 369/34 |
| 6,337,842 B1 * | 1/2002 | Wolfer et al. | 369/30.57 |
| 6,400,659 B1 * | 6/2002 | Kitaoka | 369/34.01 |
| 6,490,232 B2 * | 12/2002 | Sato | 369/30.34 |
| 6,760,052 B2 * | 7/2004 | Cummins et al. | 347/171 |

* cited by examiner

*Primary Examiner*—Angel Castro
(74) *Attorney, Agent, or Firm*—Westman, Champlin & Kelly, P.A.

(57) ABSTRACT

A CD or DVD disc processor, as shown, a recorder or duplicator (it could be a printer) has a pivoting picker mechanism having only one degree of freedom when driven for handling the discs for recording and stacking recorded discs. The picker mechanism picks the disc from the top of a supply stack of blank discs and places the disc on a loading tray of a recorder. The disc is moved into the recorder drive and removed after recording. The picker mechanism then picks the disc from the tray apparatus, the tray is retracted into the recorder, and the picker mechanism pivots beyond the tray to deposit the completed discs on a completed stack storage space below the tray level.

15 Claims, 3 Drawing Sheets

PICKER SUPPORT FOR DISC DUPLICATOR

This application refers to and priority is claimed from U.S. Provisional application Ser. No. 60/310,924, filed Aug. 8, 2001, the content of which is incorporated by reference herein.

BACKGROUND OF THE INVENTION

The present invention relates to automatic recorders/duplicators for CD's and DVD's and more particularly to a disc duplicator that has a simple design with the components of the duplicator aligned with a disc picker and placement mechanism so drive movement of the disc picker and placement mechanism requires only one degree of freedom.

There exists a need for a simpler, efficient and low cost disc (CD) duplicator. There are many conventional disc duplicators available, but they are fairly expensive which prevents most casual users or low volume businesses from acquiring and utilizing one of these systems.

Conventional disc duplicators have pick and place picker mechanisms that usually have drives for both pivotal and linear motion due to the fact that the disc storage supports and the loading trays of conventional disc duplicators cannot be reached by the picker by just one motion. Therefore the picker mechanism is complicated, and other components of the conventional disc duplicator are not arranged in an efficient manner. Most of the complexity comes from the picker mechanism needing drives for having a substantial amount of linear motion in one degree of freedom to pick or drop a disc on a tall stack of discs found in conventional duplicators plus motion in other degrees or freedom to manipulate the disc between desired locations.

SUMMARY OF THE INVENTION

The present invention relates to a disc recorder/duplicator (called a duplicator) where a disc picker mechanism is mounted on a support arm that moves in substantial one dimensional alignment with the locations of the holder of unrecorded or blank discs, the loading tray for the duplicator and the storage holder for recorded discs. The picker mechanism picks and places discs with a drive in one degree of freedom pivotal motion of a support arm.

Specifically a disc is moved by the picker mechanism from a stack of blank discs to the loading and ejecting tray for the duplicator where the disc is loaded on the tray, which is moved into the recording drive. The recording drive or sequence is engaged with a controller.

After the disc is recorded (duplicated), the tray extends and the disc is ejected from the recording drive. Then, the picker mechanism picks the recorded disc from the duplicator loading tray, the loading tray is retracted into the duplicator housing and the picker mechanism places the completed disc on a completed stack of discs on a completed stack storage space, which is located below the position of the extended loading tray.

When the finished disc storage stack is below the extended tray, driven lateral movement of the support arm is not needed to place the recorded or completed disc on the completed disc storage stack after the tray holding the recorded disc is retracted. The picker is operated on the controller to lift the recorded disc. The tray then is retracted, and the picker is lowered to drop the recorded disc into the finished disc stack. The supply stack storage space, the completed stack storage space, and the duplicator disc support tray are in substantial one dimensional alignment centered on a plane with the central axis of the picker mechanism.

The picker mechanism pivots about a horizontal (as shown) axis at the outer end of the picker mechanism support arms. The sliding path of the duplicator disc support tray is in a plane parallel to the axis of mounting of the picker mechanism support arm.

In another form of the invention, a curved disc stack holder is provided. The radius of the curve of the disc stack holder is substantially the same as the radius of the pivoting support arm of the picker mechanism.

The invention also relates to a method of handling discs for duplicating/recording in a simplified manner.

DETAILED DESCRIPTION OF THE PREFERRED EMBODIMENTS

Figure 1:
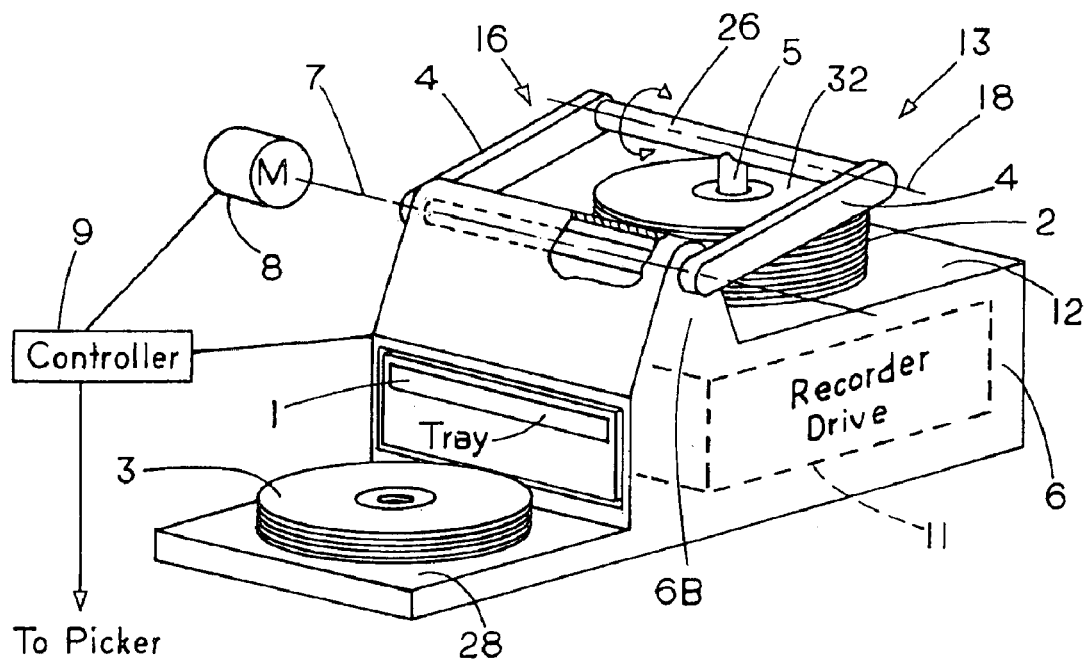
FIG. 1 is a perspective view of a disc duplicator having a picker mechanism made in accordance with the present invention showing the picker mechanism picking a disc from a supply stack of blank discs.
Figure 2:
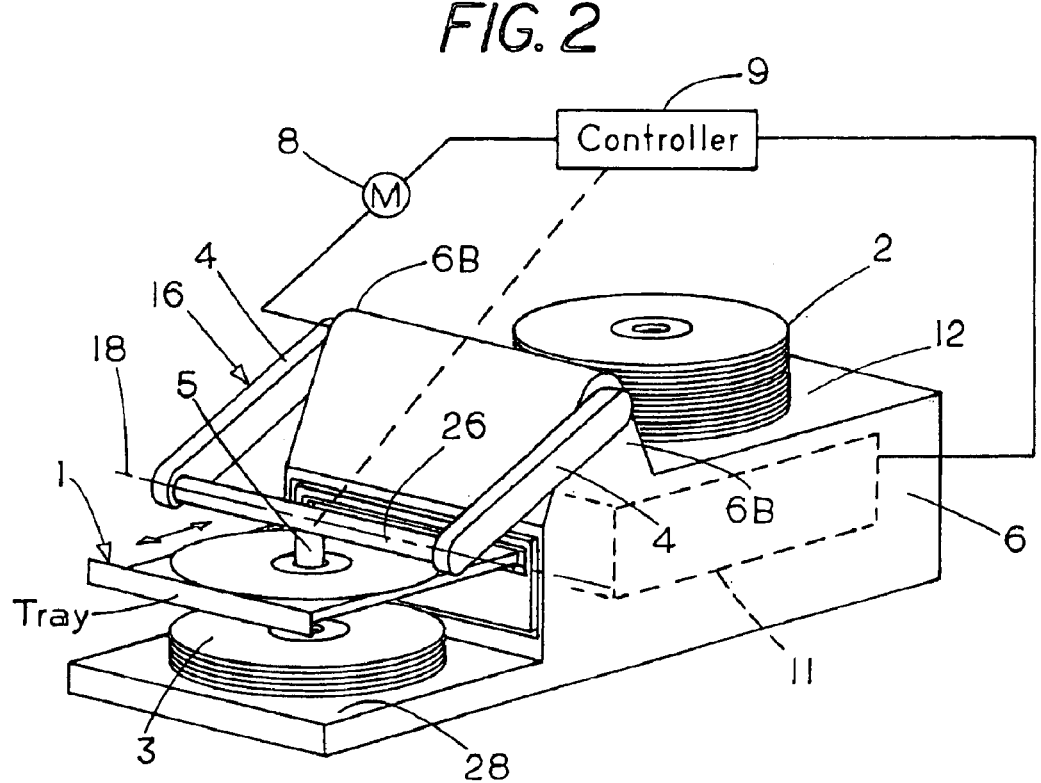
FIG. 2 is a perspective view similar to FIG. 1 where the blank disc is shown deposited in place on a duplicator support disc tray to be loaded into the recorder/duplicator.
Figure 3:
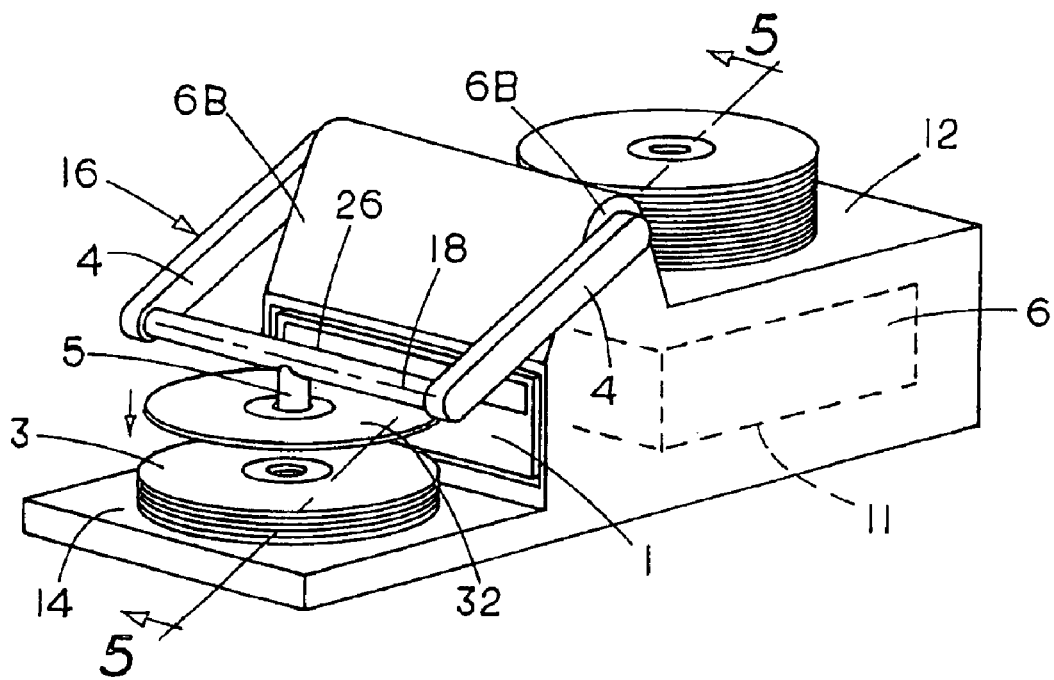
FIG. 3 is a perspective view similar to FIGS. 1 and 2 where the picker mechanism is placing a completed or recorded disc on the stack of recorded discs.

The invention disclosed herein relates primarily to an apparatus and a method for recording or duplicating a relatively small number (about 25–50 discs) recordable CD's or DVD's. The invention also can be a printer. Referring to FIGS. 1, 2, 3, and 5, in particular, a CD or DVD processor, as shown recorder/duplicator 13 (called a duplicator) but which also can be a printer, has a disc support tray 1 that extends for loading and retracts into a known recording drive 11 internally mounted in a processor cabinet 6. The recording drive 11 controls movement of the support tray 1 in response to signals from a controller 9. A disc picker mechanism assembly 16 is pivotally mounted about a main horizontal pivot axis 7 on provided supports 6B which, as shown, are part of the cabinet 6. The supports 6B can be separate from the cabinet 6, but are located adjacent to the duplicator. The pivot for the base end of picker mechanism 16, as shown, may comprise a rotatable shaft 20 onto which a pair of arms 4 are drivably mounted. The arms 4 moves in unison.

A controlled motor 8, such as a stepper motor, is used to drive the shaft 20 in the proper direction of rotation, and also determines the amount and speed of rotation of the shaft 20 and the arms 4. The motor 8 is controlled by input control signals from the controller 9 that programs the movement of shaft 20 and thus pivotally places a disc picker 5 in desired positions. Controller 9 also controls the recorder drive 11 which in turn controls the movement of the disc support tray 1. The controller 9 controls operation of picker 5 to engage and release discs, using the center opening of the discs.

The disc picker 5 is mounted on cross shaft 26 extending between the arms 4. The proper orientation of picker 5 can be maintained by allowing shaft 26 to freely rotate on the arms 4 and permit gravity to maintain the vertical orientation of the picker. A counterweight can be attached to picker 5, if needed. The axis of shaft 26 and pivot axis 7 for the base ends of the arms 4 are maintained parallel. Control leads for the picker can be provided through a bore in shaft 26 and arms 4, back to connections at the base of the arms, in a known manner.

Alternatively, a positive positioning of link between shaft 26 and picker 5 can be provided for maintaining the picker orientation. As shown schematically in FIG. 5, a pulley or sprocket 22 can be fixed to one support 6B centered around the shaft 20, but permitting arms 4 to rotate relative to the pulley. Shaft 26 is provided with a drive pulley 28 of the same size as sprocket 22. The pulleys 22 and 28 are connected together by a drive belt 24, and as the arms 4 are rotated the picker 5 is also rotated so it remains oriented in space.

The picker or disc holder 5 can be used to pick a disc in the center opening, and hold the disc, as is known in the prior art, for example as shown in U.S. Pat. No. 5,873,692. Also, a vacuum operated picker can be used, as shown in U.S. Pat. No. 6,141,298, which also discloses a disc duplicator.

In FIG. 1, a CD or DVD blank disc 32 in the process of being picked up by the picker 5 of picker mechanism assembly 16. Disc 32 is the top disc in a supply stack 2 of unrecorded or blank discs. The stack or store 2 is located on a storage space 12 on a top panel of cabinet 6, and the storage space is centered on the bisecting plane of the duplicator and the tray picker 5. Disc support tray 1 for the duplicator is extended, and the arms 4 are driven by the motor 8 to the position shown in FIG. 2 where, by releasing the picker, the disc is placed on support tray 1 which is the loading and ejecting tray for the recording drive 11. The tray 1 supports the disc in a known manner, after it is released by the picker, and the picker is lifted by reversing rotation of arms 4 a short distance. Then the tray 1 is slidably moved by controller 9 and the recorder drive 11 to the recording position in recorder drive 11. The path of the tray is in a plane parallel to the horizontal axis 7 of the picker mechanism assembly 16.

Once disc 32 is loaded into the recording drive 11 the recording drive is engaged for duplicating a recording onto the blank disc. The recording drive is conventional. After the recording is completed, the recording drive and controller 9 cause the tray 1 and disc 32 to be moved out of the recording drive 11 by moving the tray at 1 to its extended position. The picker 5 of the picker mechanism assembly 16 has been held above the tray position, and is then moved down by motor 3 and arms 4 to pick up the disc 32, which is fully recorded, from the tray 1. The arms 4 are rotated up to lift the picker and fully recorded disc 32 away from the tray 1, for clearance, and then the tray 1 is retracted into the duplicator by commands from controller 9 so that the disc 32 can be lowered by the arms 4 onto a completed stack 3 of discs in a storage space or support 28 immediately below the tray. 1 and also centered on the picker mechanism and tray 1. The picker 4 is operated to drop the disc; (the discs can fall onto the completed stack 3).

The arms 4 are then reversed by motor 8 to pick up a new blank disc in the storage stack 2 on space 12 on top of cabinet 6, and the tray 1 is extended from the duplicator. The process is then repeated, with a new disc being placed onto the tray, the picker is released, and lifted, leaving the blank disc on the tray and the tray is retracted into the duplicator for duplicating/recording. The recorded disc is moved out of the recorder drive by extending the tray, and then picked up by picker 5, the tray is retracted, and the second recorded disc put onto the complete stack 3 of discs.

A disc duplicator having an extendable and retractable tray is shown in U.S. Pat. No. 6,327,230, by way of example. The device in patent '230 also includes a label printer. The label printer has a disc tray and the duplicator tray aligned vertically in U.S. Pat. No. 6,327,230. The picker mechanism shown herein can be used for moving a recorded disc onto a label printer and printing on a label, which is a second operation, by properly adjusting the length and position of the pivoting arms 4.

Figure 4:
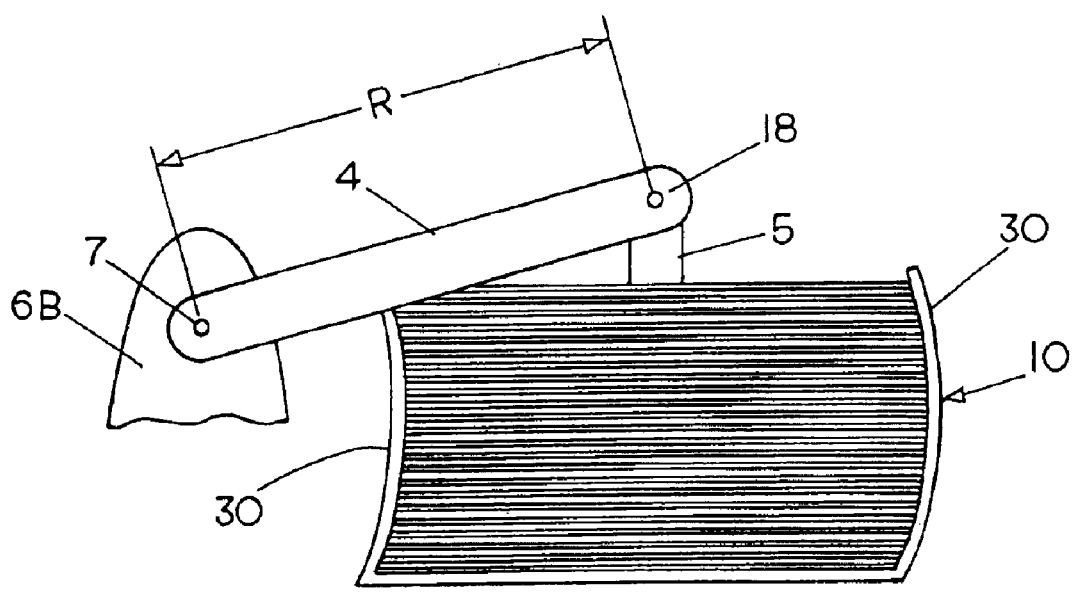
FIG. 4 is a side view of a second embodiment of the present invention showing a curved stack holder for a stack of discs.
Figure 5:
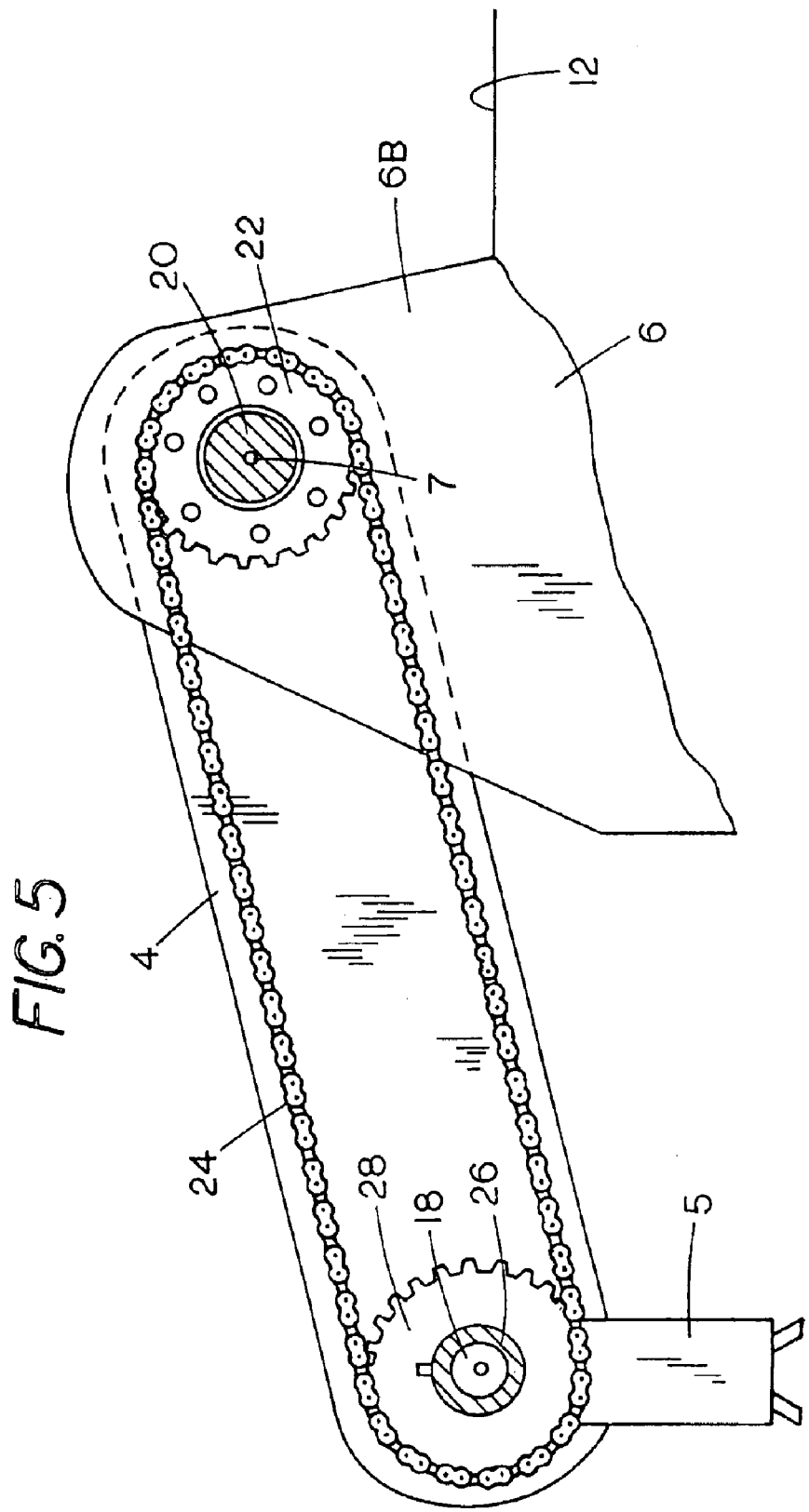
FIG. 5 is a cross sectional view taken generally along line 5—5 of FIG. 3 showing one type of internal component of the picker mechanism.

FIG. 4 shown a modified form of a disc stack holder 10, that has curved supports 30 that guide the discs This type of curved disc stack holder can be used either with the supply stack 2, or the completed stack 3 or both. The radius of he arm 4 of the picker mechanism assembly 16 is defined in FIG. 4 as "R" and is a distance between the axis 7 of rotation of the arms 4, and the axis 18 of shaft 26. The curve indicated on the support 30 of the curved stack holder 10 coincides with the arc having a radius A. The curved stack of the discs aids in increasing disc capacity, because the radius of the movement of the picker mechanism assembly 16 and the curve of supports 30 of the stack holder 10 will coincide, resulting in more easily stacking, or picking up discs with the picker 5.

The placement of the completed discs has to be the location that is not in the path of movement between the blank disc storage and the tray or carriage for the recorder/duplicator, because the discs have to be carried across that path on the single axis of pivoting of the picker mechanism assembly. The storage tray for the completed discs can be offset laterally parallel in a direction perpendicular to the axis of the picker support a short distance, and a slide or similar guide to be used to move the items laterally. However, the position of release has to be such that it will position the disc on a completed disc guide or support at some location in the path of pivotal movement of the picker support. There could be a guide that moves into a disc receiving position after recording, and after the disc had been lifted from the tray. In other words, a support could be inserted above the tray 1, in a position to provide a sliding guide for moving the completed disc out of the way of the path of movement of the picker mechanism assembly between the blank disc storage and the tray. Such a movable support would then have to be moved out of the path before the next blank disc was deposited in the recorder/duplicator tray.

As noted, there are many printers that have an extendable and retractable tray that moves identically to the tray shown with a recorder. Thus the picker shown can be used with a printer, and with modification, with a combined unit as shown in U.S. Pat. No. 6,327,230. The terms "processor" and "operation" are meant to include duplicators or printers, and printing a label on a disc as well as duplicating or recording.

Although the present invention has been described with reference to preferred embodiments, workers skilled in the art will recognize that changes may be made in form and detail without departing from the spirit and scope of the invention.

What is claimed is:

1. A disc processor comprising:
   an operational drive;
   a supply stack storage space;
   a picker mechanism pivotable about a picker mechanism axis;
   a loading and ejecting tray in sliding association with the drive, the sliding path of the tray is in a plane substantially parallel to the picker mechanism axis and movable between loading and recording positions;

a drive to move the picker mechanism about the picker mechanism axis to pick a disc from a supply stack of blank discs on the supply stack storage space and pivot the picker mechanism about the picker mechanism axis to place and remove the discs on the tray and remove discs from the tray, wherein the picker mechanism, the supply stack storage space, and the tray are in substantially centered along a plane perpendicular to the picker mechanism axis.

2. The processor as claimed in claim 1 wherein the picker mechanism is aligned with a completed disc storage space tray on an opposite of the tray from the supply stack storage space.

3. The processor as claimed in claim 1 and a controller for controlling extension and retraction movement of the tray and also controlling movement of the picker mechanism.

4. The processor as claimed in claim 3 wherein at least one of the supply stack storage space and completed stack storage space is provided with a curved disc stack holder.

5. The processor as claimed in claim 4 wherein the radius of a curve of the curved disc stack holder is substantially the same as the radius of movement of the picker mechanism.

6. The processor of claim 3 wherein the processor comprises a disc duplicator.

7. A drive for moving a disc picker that engages, supports, and releases planar discs having a center opening, the picker being movable for movement between a first storage position, an operation position, and a second storage position for discs that have completed an operation, comprising a mechanism for performing the operation on the discs, a support for the disc picker pivotally movable about a single axis of rotation which is substantially parallel to the plane of the discs, the disc picker at an outer end of said support, said disc picker being constructed to maintain a spatial orientation throughout the pivoting movement of the support, the support being movable to a first position overlying the first storage position, and the picker being operable to lift a disc from the first storage position, the support being pivoted about the axis to a second position in a partial rotational path of movement in a first direction from the first storage position to overlie an operation support in the operation position for performing the operation on the disc, the picker being operable to deposit a disc on the operation support, and the picker support being movable to lift a completed disc from the operation support subsequent to completion of the operation, and being movable to a third position to deposit the completed disc at the second storage position.

8. The picker support of claim 7, wherein the operation support is movable to a position clearing the path of movement of discs carried by the picker as the picker support rotates about the axis, and wherein the subsequent movement of the picker support after retrieving a completed disc is in the same direction of pivoting as the pivotal movement from the first storage position to the operation support and beyond the operation position second support position offset from the operation position, but substantially in the path of pivotal movement of the picker support.

9. The picker support of claim 8, wherein the discs lifted have center axes, and wherein the center axes of the discs lie on a common plane when in the first storage position, the second storage position and the operation position.

10. The picker support of claim 7, wherein said picker support comprises a pair of spaced arms mounted for simultaneous movement about the axis, a cross shaft between ends of the arms opposite from the axis, the picker for the disc being mounted on the cross shaft substantially along a bisecting plane between the arms.

11. The picker support of claim 10 wherein said shaft carrying the picker is freely rotatable about an axis parallel to the axis of pivoting of the arms.

12. The picker support of claim 10, and a drive to maintain the cross shaft and the picker at a substantially identical orientation in space as the arms pivot about the axis.

13. A method for performing an operation on a disc comprising:

pivoting a picker mechanism about a main axis of rotation;

sliding a loading and ejecting tray for a mechanism performing the operation along a path in a plane parallel to the main axis of rotation of the picker mechanism;

moving a disc from a supply stack of blank discs on a supply stack storage space by pivoting the picker mechanism;

placing a disc on the tray using the picker mechanism;

loading the disc into the mechanism for performing the operation by moving the tray, and performing the operation on the disc;

moving the tray out of the mechanism for performing the operation;

picking the disc from the tray; and placing the disc on a completed disc storage space by pivoting the picker mechanism beyond the tray from the supply stacks to a different pivoting position than when picking the disc from the tray.

14. The method as claimed in claim 13 further comprising vertically orienting a disc picker included in the picker mechanism for picking and releasing discs as the picker mechanism is pivoted.

15. The method as claimed in claim 13 further comprising curving a stack holder for at least one of the supply stack of blank discs and a stack of recorded discs in the completed disc storage space.

* * * * *